United States Patent [19]

Pausch

[11] Patent Number: 4,995,645
[45] Date of Patent: Feb. 26, 1991

[54] ELBOW CONNECTION FOR PNEUMATIC CONVEYING SYSTEM

[75] Inventor: Josef Pausch, Hopkins, Minn.

[73] Assignee: General Resource Corporation, Hopkins, Minn.

[21] Appl. No.: 481,596

[22] Filed: Feb. 20, 1990

[51] Int. Cl.⁵ ............................................. F16L 45/00
[52] U.S. Cl. .................................... 285/127; 285/179; 406/193
[58] Field of Search .................. 285/179, 127, 176; 406/193, 195

[56] References Cited

U.S. PATENT DOCUMENTS

| | | |
|---|---|---|
| 1,108,918 | 9/1914 | Lob ................................ 285/179 X |
| 1,289,154 | 12/1918 | Girtanner et al. ............. 285/179 X |
| 2,056,782 | 10/1936 | Fosdick ......................... 285/179 X |
| 2,911,235 | 11/1959 | Stumbough .................... 285/179 X |
| 3,144,276 | 8/1964 | Ortiz . |
| 3,405,738 | 10/1968 | Oka . |
| 3,450,442 | 6/1969 | Farnworth . |
| 4,387,914 | 6/1983 | Paulson et al. . |
| 4,457,849 | 7/1984 | Heinze et al. . |
| 4,554,721 | 11/1985 | Carty et al. . |
| 4,595,319 | 6/1986 | Cook . |
| 4,621,953 | 11/1986 | McGuth . |
| 4,641,864 | 2/1987 | Heine et al. . |
| 4,767,243 | 8/1988 | Brannstroom . |

FOREIGN PATENT DOCUMENTS

| | | | |
|---|---|---|---|
| 614513 | 2/1961 | Canada ............................... 285/179 |
| 1120367 | 12/1961 | Fed. Rep. of Germany ...... 285/179 |
| 1123256 | 2/1962 | Fed. Rep. of Germany ...... 285/179 |
| 70704 | 7/1959 | France ............................... 285/179 |

Primary Examiner—Dave W. Arola
Attorney, Agent, or Firm—Paul L. Sjoquist

[57] ABSTRACT

An elbow connection for pneumatic conveying systems is provided. The elbow has an inlet opening, an outlet opening and a curved area of short radius extending therebetween. The section of the elbow between the inlet and outlet openings has a cross-sectional area that is substantially greater, at least 1.5:1, than the cross-sectional area of the inlet and outlet openings to reduce the wear of the elbow wall caused by the material conveyed therein.

2 Claims, 1 Drawing Sheet

ELBOW CONNECTION FOR PNEUMATIC CONVEYING SYSTEM

This invention relates generally to pneumatic or fluidic conveying systems and, more particularly, to an elbow connection for use in such conveying systems.

BACKGROUND OF THE INVENTION

The efficiency of pneumatic or fluidic conveying systems for particulate or other fungible materials such as grains or pellets of various material has long been recognized.

One problem with such systems is that when a change of direction is effected, the material conveyed in the system tends to continue to travel in a straight line. The result is substantial wear of the wall of the elbow, pipe or conveying member which is being used to create the change in direction.

Other problems associated with changing directions of pneumatic conveying systems include substantial pressure loss or drop in the area of the curve or radius of the turn and breakage or degradation of the product being handled by the system.

There are many and various methods and devices for addressing these problems in the prior art. U.S. Pat. Nos. 4,641,864 and 4,767,243 disclose pipe bends or elbows which cause the conveyed material to form a cushion of that material to prevent erosion of the walls of the conveying system. Similarly, there are commercially available corner fittings which cause conveyed material to impinge against material already trapped in the elbow or fitting rather than against the fitting wall, thereby reducing wear and lessening degradation of material.

U.S. Pat. Nos. 4,621,953; 3,450,442; 4,554,721; 3,144,276 and 4,595,319 disclose other methods directed to reducing erosion of the conduit forming pneumatic conveying systems. The disclosed methods include providing an impingement plate U.S. Pat. No. ('319), providing anti-erosion protrusions U.S. Pat. No. ('953) or providing wear resistant linings or materials for the inside walls of the conveying system pipe U.S. Pat. No. (721).

U.S. Pat. No. 4,387,914 discloses an elbow having an enlarged vortex chamber aligned with the entry axis to collect material and to form a vortex within the chamber thereby preventing conveyed material from hitting the walls of the elbow by causing it to deflect off the soft plug of material already collected in the chamber.

U.S. Pat. No. 3,405,738 discloses a pneumatic conveying pipe which transports material into a collector wherein the transport path is curved and the cross-sectional area of the curve is enlarged gradually from the initial bend to the final bend. This patent is directed to preventing bottlenecks in the bent portion of the transport pipe and to maintaining the passage of air flow so that powder or grains transported in the pipe will not plug the pipe.

SUMMARY OF THE INVENTION

A main object of the present invention is to provide a simple, inexpensive and efficient way to improve the material handling characteristics of pneumatic or fluidic conveying systems and the like.

Another object of the present invention is to provide an elbow or bent pipe segment for such pneumatic systems which facilitates radical changes in the direction of flow of the conveyed material.

Other objects of the present invention are to provide an elbow for pneumatic conveying systems which diminishes the pressure drop or loss in curved portions of the conveying system, which improves the longevity of elbow or corner pipe sections by reducing the wear caused by the material conveyed therein and which improves the quality of material handling by reducing the degradation or damage of the material conveyed.

An important feature of the present invention is an elbow for pneumatic o fluidic material handling systems having an inlet opening and an outlet opening and a curved area of short or low radius therebetween wherein the section of the elbow between the inlet and outlet openings has a cross-sectional area substantially greater than the cross-sectional area of the inlet and outlet openings.

Another feature of the present invention is that the enlarged cross-sectional area causes a substantial reduction in the velocity of the particles or material conveyed through the inlet into the elbow, permits the velocity of the material leaving via the outlet to be increased back to conveying line velocity, yet creates a very small pressure drop or loss in the area of the elbow.

The applicant has discovered that the enlarged cross-sectional area of the elbow no longer requires that a pad or accumulation of the conveyed material be collected in the area of the elbow to reduce wear thereof. Further, the applicant has discovered that the enlarged cross-sectional area, when held in specific relation or ratio to the cross-sectional area of the pipes of the conveying system, reduces damage to the pipe wall and to the material being conveyed. In addition, the present invention substantially reduces the pressure loss or drop in the area of the elbow thereby reducing the chances that the material being conveyed will plug up the system.

An important advantage of the elbow of the present invention is improved efficiency and cost effectiveness. The elbow causes less conveyed material degradation and reduces the wear on the elbow walls thereby reducing the frequency of replacement. Additionally, the elbow of the present invention does not require expensive multiple layer or wear resistant layer wall construction.

Other objects, features and advantages of the present invention will be understood with reference to the following specification and appended drawings and claims.

DETAILED DESCRIPTION OF THE PREFERRED EMBODIMENT

Figure 1:
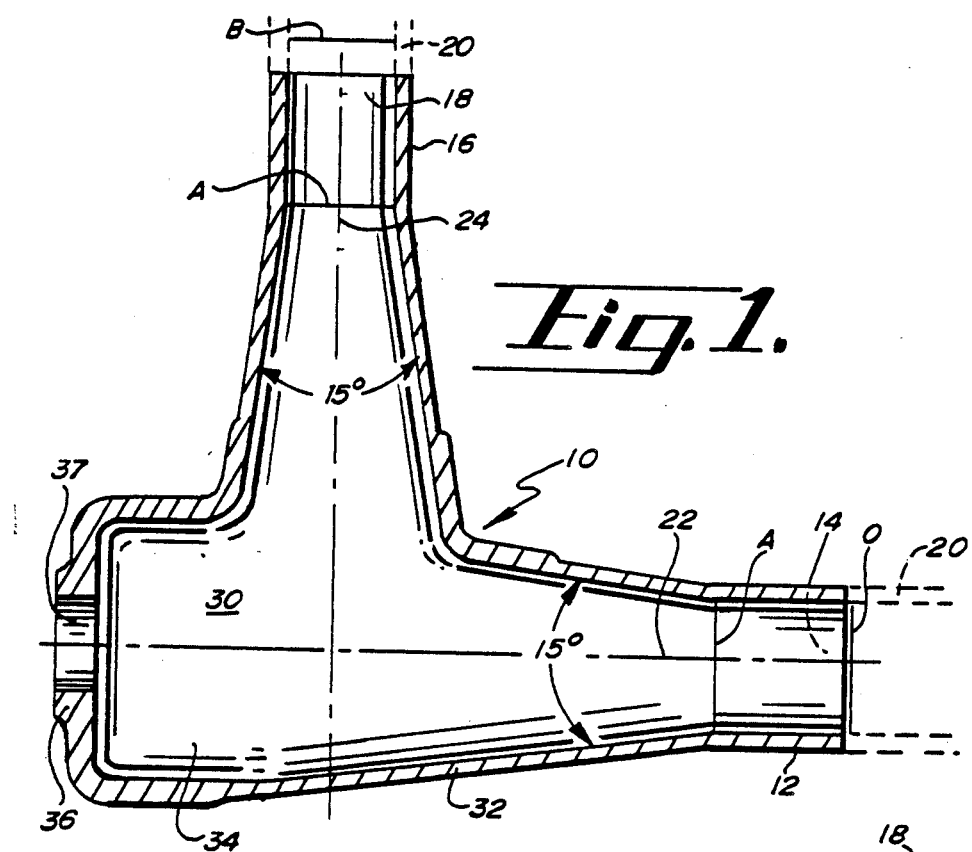
FIG. 1 is a side elevational section of the elbow of the present invention.
Figure 2:
FIG. 2 is an end elevation of the elbow of the present invention as viewed from the inlet opening.
Figure 3:
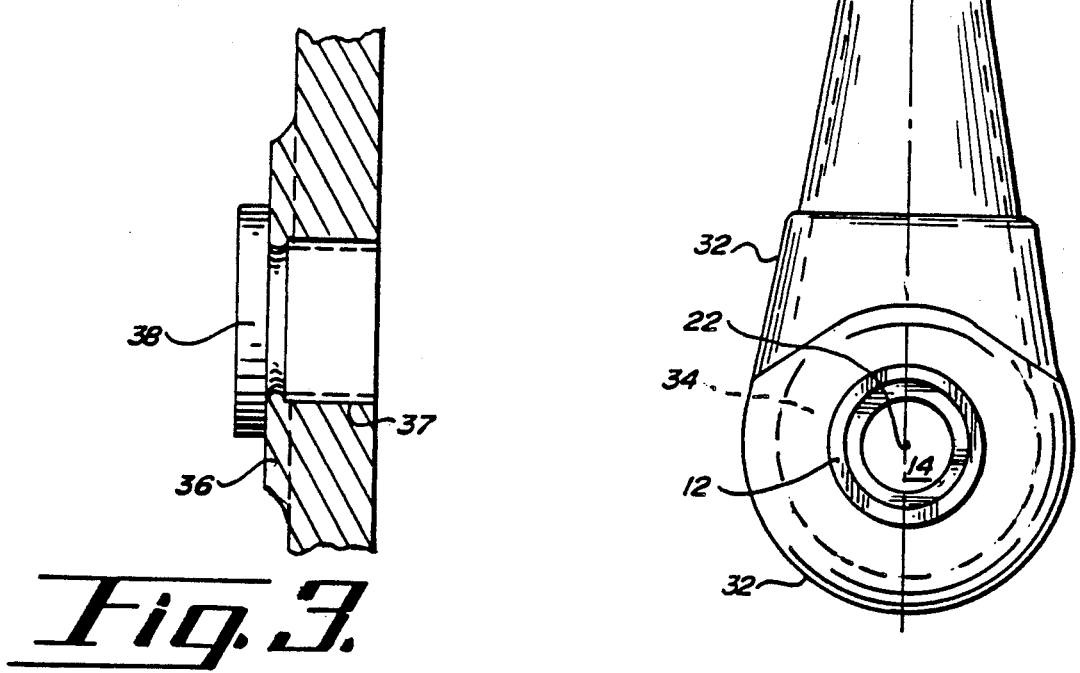
FIG. 3 is a partial section showing the end wall of the elbow of the present invention and specifically the plug therein.

With reference to the figures, it will be noted that the elbow of the present invention is designated generally at 10. The elbow 10 includes a cylindrical inlet pipe 12 having an inlet opening 14. The elbow 10 also has an outlet pipe 16 with an outlet opening 18. The inlet and outlet pipes 12, 16 have central axes 22, 24, respectively.

The central axes 22, 24 lie in a common plane and at an angle to each other. As shown in the figures, the angle is normal but may be varied as to the particular conveying system with which the elbow 10 is being used.

The openings 14, 18 have the same cross-sectional area A. This cross-sectional area A corresponds to the cross-sectional area B of the conveyor pipes 20 (shown in FIG. 1 in phantom only).

An expanded area or chamber 30 is formed between inlet opening 14 and outlet opening 18. The generally cylindrical expanded area 30 has a continuous wall 32 that expands or diverges at a constant, relatively high rate from the diameter of the inlet and outlet pipes 12, 16 to the region of largest diameter 34. As seen in FIG. 1 this expansion angle is 15°; however, the rate of expansion may be varied as required.

At the maximally expanded region 34 of the expanded area 30, in the example shown in FIG. 1, the cross-sectional area of the expanded area 30 is approximately four times as large as the area of the pipe inlet. The applicant has discovered that an effective range of the ratio of the cross-sectional area of the expanded area 30 to the cross-sectional area of the elbow 10 inlet and outlet pipes 12, 16 is between 1.5 to 1 and 10 to 1. It should be recognized that the specific dimensions of the respective features may be varied as required within the range stated herein above.

Expanded area end wall 36 may have an aperture 37 for receiving an access plug 38 permitting access to the expanded area interior. A non-threaded plug 38 is shown, but plug 38 may be a threaded plug as well.

In use, the subject elbow may be installed in a pneumatic conveying system wherever it is desired to sharply or radically change the direction or turn the flow of the conveyed material. The elbow 10 will not cause a large pressure drop in the elbow connection and will prevent substantial wear of the inner surface of the elbow wall 32. Specifically, the expanded area 30 with a cross-sectional area of at least 1.5 up to 10 times the cross-sectional area of the inlet and outlet pipes 12, 16 causes a substantial reduction in the velocity of the material conveyed through the inlet opening 14 into area 30. The area 30 also permits the velocity of the material leaving the area 30 through the outlet opening 18 to be increased back to the conveying line velocity rapidly and without a large pressure drop, thereby avoiding plugging the elbow 10 itself.

Tests which have been run with the present invention show a 50% reduction in pressure drop losses, in comparisons to long radius L-connectors. In one experiment, a 90°, 36 inch radius L-connector was connected to a 2-inch conveying line and conveyed sand at 100 pounds per minute, with an inlet velocity of 6,000 feet per second. This L-connector showed a measured pressure drop of 30-inch W.C. At an inlet velocity of 7,000 feet per second, the connector showed a 38-inch W.C. pressure drop loss. By contrast, the present invention connected to the same conveying line showed, at 6,000 feet per second the inlet velocity, a 13-inch W.C. pressure drop; at an inlet velocity of 7,000 feet per second, the invention showed a 15-inch W.C. pressure drop. The experimental unit used for this test had an expansion chamber ratio of 1.5:1, compared to the inlet pipe cross-sectional area. Further tests were conducted by enlarging the cross-sectional area ratio in steps, up to a ratio of 10:1. The measured pressure drop with each of the increased ratios proportionately dropped to a final pressure drop of 2-inch W.C.

Other and further advantages of the present invention have been noted in these experiments. For example, when the L-connector area ratio is set between 2:1 to 3:1, a 30%–50% reduction in breakage of the conveyed product was noted.

The elbow 10 of the present invention may be made from materials such as aluminum, cast iron or stainless steel, although other materials may also be used according to the needs of the conveying system. The subject elbow 10 may be designed to be connected by various methods to the conveying pipes 20: examples include victaulic coupling, fluidizer line coupling or standard cast iron flange type couplings. It is believed that the advantages achieved by the present invention result from a marked decrease in the input velocity of the particulate matter as it passes from the inlet opening into the expansion chamber, and a subsequent marked increase in the exit velocity of the particulate matter as it passes from the expansion chamber to the outlet. In some cases, it is believed that the particulate matter velocity approaches zero in the region of highest cross-sectional area within the connector, and increases thereafter to line velocity as the particulate matter leaves the outlet. It is believed that the slow down in velocity of particulate matter is at least partially the reason for the reduced wear and abrasion which has been noted in the interior walls of the elbow 10.

The present invention may be embodied in other specific forms without departing from the spirit or essential attributes thereof. It is therefore desired that the present embodiment be considered in all respects as illustrative and not restrictive, reference being made to the appended claims rather than to the foregoing description to indicate the scope of the invention.

What is claimed is:

1. An elbow for changing the direction of flow of material conveyed in conduits in a fluidic or pneumatic material handling conveyor, said elbow comprising:
   (a) cylindrical inlet and outlet pipes each having a first end for connection to a conveyor conduit and a second interior end, and each having a continuous cylindrical wall defining an inlet opening in said inlet pipe and an outlet opening in said outlet pipe, said openings having a specific cross-section area;
   (b) a generally frusto-conical inlet section and outlet section, each having a narrow end and a wider end, and a continuous frusto-conical wall therebetween, wherein said wall diverges to a region of maximum expansion at said wider end, the small end being continuous with said second interior end of the inlet and outlet pipes; and
   (c) a chamber formed at the intersection of the respective wider ends of said frusto-conical inlet section and outlet section, said chamber having a cylindrical extension open to and in communication with said openings and axially aligned with said inlet opening and having an end wall projecting beyond the wider end of said outlet section, the cross-sectional area of said cylindrical extension being between 1.5 and 10 times the cross-sectional area of said inlet opening.

2. An elbow for changing the direction of flow of material conveyed in conduits in a fluidic or pneumatic handling conveyor, said elbow comprising:
   (a) an inlet having a cylindrical inlet opening connected to a first expanded section away from said inlet opening, aligned along a first axis;

(b) an outlet having a cylindrical outlet opening connected to a second expanded section away from said outlet opening, aligned along a second axis which intersects said first axis;

(c) a cylindrical chamber section open to and in communication with said openings and aligned along said first axis and having cylindrical walls joining said first expanded section and said second expanded section, said cylindrical chamber having an end wall normal to said first axis and spaced away from said second expanded section; said end wall having an access opening therethrough; the cross-sectional area of said cylindrical chamber section being at least 1.5 to 10 times the cross-sectional area of said inlet opening and said outlet opening; whereby the material conveyed in the conveyor undergoes a substantial reduction in velocity in said cylindrical chamber and undergoes a generally equal substantial increase in velocity on leaving said outlet opening.

* * * * *